US011159353B1

United States Patent
Chen et al.

(10) Patent No.: US 11,159,353 B1
(45) Date of Patent: *Oct. 26, 2021

(54) SEAMLESS BIT-LEVEL LOW-LATENCY RETIMER FOR DATA LINKS

(71) Applicant: Parade Technologies, Ltd., San Jose, CA (US)

(72) Inventors: Xiang Chen, San Jose, CA (US); Ming Qu, San Jose, CA (US); Chi-hsiang Chin, Taipei (TW); Haijun Zhu, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,456

(22) Filed: Mar. 3, 2021

Related U.S. Application Data

(63) Continuation of application No. 17/071,655, filed on Oct. 15, 2020, now Pat. No. 10,979,258.

(51) Int. Cl.
    *H04L 25/14*    (2006.01)
    *H04L 25/03*    (2006.01)
    *H04L 25/02*    (2006.01)

(52) U.S. Cl.
    CPC .......... *H04L 25/14* (2013.01); *H04L 25/0272* (2013.01); *H04L 25/03878* (2013.01)

(58) Field of Classification Search
    CPC .................. H04L 25/14; H04L 25/03878; H04L 25/0272
    See application file for complete search history.

(56) References Cited

U.S. PATENT DOCUMENTS

2017/0371831 A1\* 12/2017 Das Sharma ....... G06F 13/4068

OTHER PUBLICATIONS

Chen, Quayle Office Action, U.S. Appl. No. 17/071,655, dated Dec. 3, 2020, 10 pgs.
Chen, Notice of Allowance, U.S. Appl. No. 17/071,655, dated Dec. 16, 2020, 6 pgs.

\* cited by examiner

*Primary Examiner* — Nader Bolourchi
(74) *Attorney, Agent, or Firm* — Morgan, Lewis & Bockius LLP

(57) ABSTRACT

This application is directed to transferring data over a data link coupled between two electronic devices. The data link includes a retimer having a full data path and a bit level data path that are coupled in parallel. A first sequence of data packets is transferred via the bit level data path of the retimer. While transferring the first sequence of data packets, the data link detects initiation of an equalization procedure based on an initiation data packet in the first sequence of data packets. In accordance with detection of the initiation of the equalization procedure, the data link selects the full data path of the retimer for data transfer over the data link. During the equalization procedure, a second sequence of data packets immediately follows the first sequence of data packets, and is transferred via the full data path of the retimer.

20 Claims, 11 Drawing Sheets

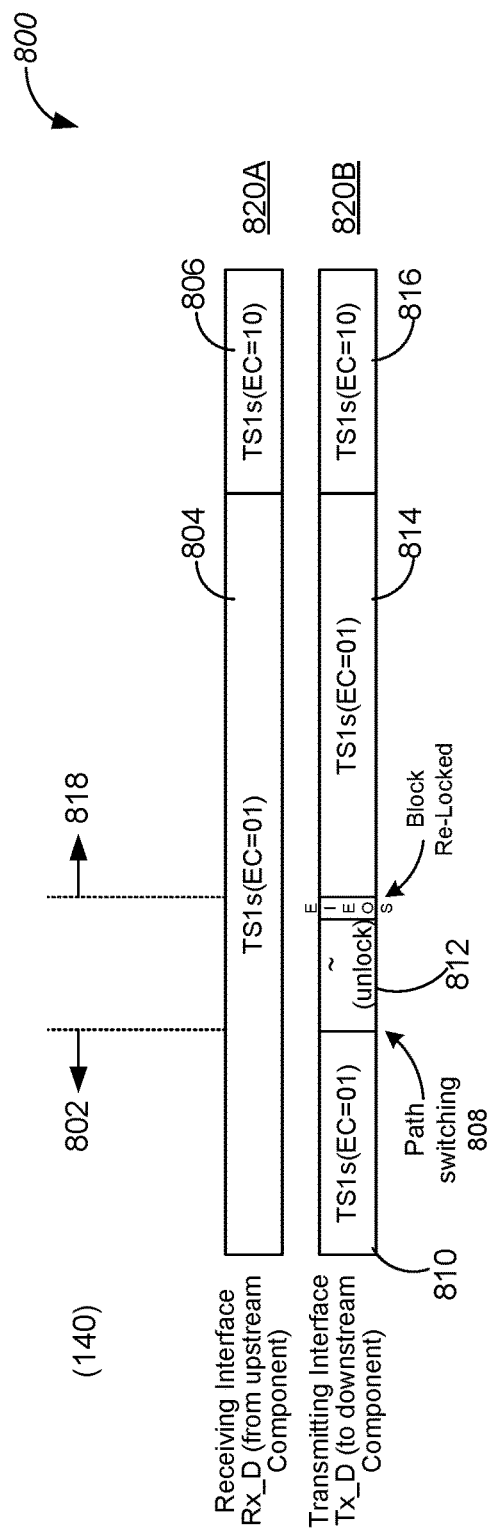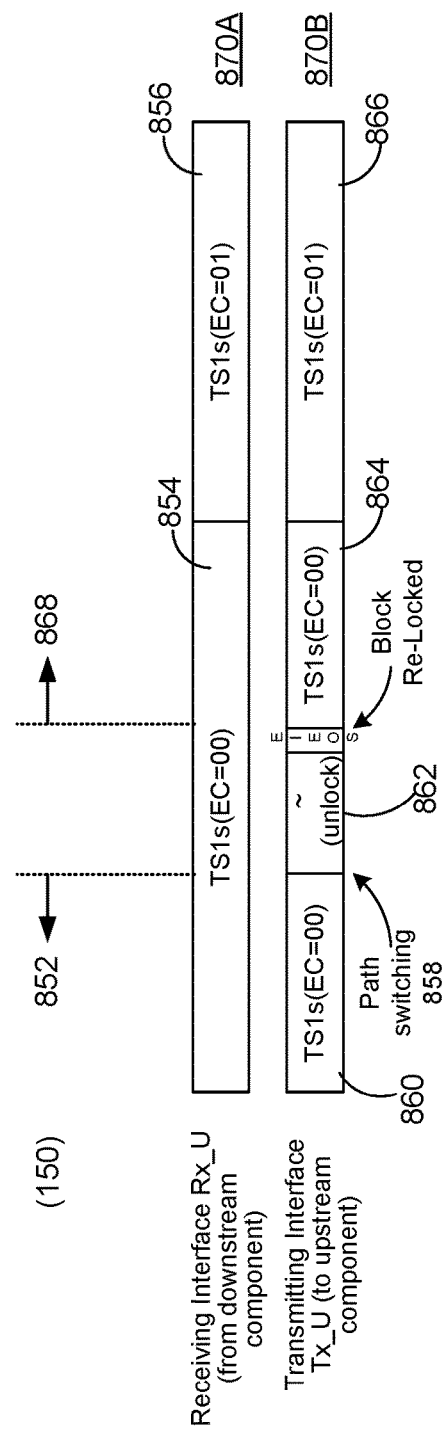

SEAMLESS BIT-LEVEL LOW-LATENCY RETIMER FOR DATA LINKS

RELATED APPLICATIONS

This application is a continuation of and claims priority to U.S. patent application Ser. No. 17/071,655, filed Oct. 15, 2020, titled "Seamless Bit-Level Low-Latency Retimer for Data Links," which is incorporated by reference by its entirety.

TECHNICAL FIELD

This application relates generally to data communication, including but not limited to, methods and systems for transferring data between two electronic devices or components using a high-speed serial expansion bus, such as a Peripheral Component Interconnect Express (PCI Express) bus.

BACKGROUND

Many electronic devices are physically coupled to each other and communicate with each other using data links and interfaces that comply with high-speed serial computer expansion bus standards (e.g., PCI Express). These bus standards allow application of retimers and redrivers to extend a channel reach at a high data speed. A redriver is an analog reach extension device designed to boost portions of a signal to counteract attenuation caused by signal propagation over a physical interconnect of a corresponding data link. A retimer is a mixed-signal device that is standard-aware and has an ability to fully recover the data, extract the embedded clock, and retransmit a fresh copy of the data using a clean clock. Compared with a redriver, a retimer actively participates in applying the bus standard to implement negotiation, timeouts, bit manipulation, jitter resetting, signal equalization, skew correction, and many other functions. Despite improvement of data quality, these functions implemented by the retimer cause an extended latency to the data transferred over the corresponding data link. For example, a one-way latency is dozens of nanoseconds at a data rate of 16 Gbps for a PCI Express 4.0 link using a retimer. Given that the PCI Express 4.0 link is bi-directional, a round-trip latency can take as much as 100 nanoseconds at the data rate of 16 Gbps. Some electronic devices are sensitive to data transmission latencies caused by the data links, and demonstrate compromised performance when the data transmission latencies increase. It would be beneficial to have a more efficient data transfer mechanism than the current practice.

SUMMARY

This application is directed to a data link integrating a full data path and a bit level data path in a retimer and activating the bit level data path for low latency data communication. The bit level data path is enabled to transfer data in a first latency time, and the full data path is enabled to transfer data in second latency time that is greater than the first latency time. The full data path is seamlessly selected and deselected on a physical level of the data link by the retimer itself, automatically and without intervention from other electronic devices or components (e.g., an upstream component and a downstream component coupled to the data link). By these means, a retimer related data latency can be reduced to two nanoseconds or less in a one way data link that complies with specifications of PCI Express 3.0 or above, while an equalization procedure is still implemented via the full data path to provide equalization results (e.g., filtering coefficients of a finite impulse response driver) to extend a channel reach.

In one aspect, a method is implemented to transfer data between a first electronic device and a second electronic device using a data link (e.g., a PCI Express link) coupled therebetween. The datalink includes a retimer having a full data path and a bit level data path that are coupled in parallel. The data link transfers a first sequence of data packets from the first electronic device to the second electronic device via the bit level data path. While transferring the first sequence of data packets, the data link detects initiation of an equalization procedure based on an initiation data packet in the first sequence of data packets. In accordance with detection of the initiation of the equalization procedure, the data link selects the full data path of the retimer for data transfer over the data link. During the equalization procedure, the data link transfers a second sequence of data packets, which immediately follows the first sequence of data packets, from the first electronic device to the second electronic device via the full data path. In some embodiments, the data link detects termination of the equalization procedure based on a termination data packet in the second sequence of data packets and selects the bit level data path of the retimer for data transfer over the data link in accordance with detection of the termination of the equalization procedure.

In another aspect, an electronic system includes a data link coupled between a first electronic device and a second electronic device. The data link includes a retimer having a bit level data path, a full data path, and a path controller. The bit level data path is configured to transfer a first sequence of data packets from the first electronic device to the second electronic device. The full data path is coupled in parallel with the bit level data path, and configured to transfer a second sequence of data packets, which immediately follows the first sequence of data packets, from the first electronic device to the second electronic device during an equalization procedure. The path controller is coupled to the bit level data path and to the full data path. The path controller is configured to (i) detect initiation of the equalization procedure, while the first sequence of data packets is being transferred, based on an initiation data packet in the first sequence of data packets and (ii) select the full data path for data transfer over the data link in accordance with detection of the initiation of the equalization procedure. In some embodiments, the retimer includes a first retimer, and the data link further includes a second retimer that is coupled in series with the first retimer on the data link.

In some embodiments, the bit level data path further includes a serial first in first out (SFIFO) circuit configured to sequentially transfer the first sequence of data packets via the data link without altering any data bit in the first sequence of data packets. The full data path further includes one or more of: a serial-to-parallel converter, a descrambler, a decoder, a data manipulator, an encoder, a scrambler, a deskewer, and a parallel-to-serial converter. The full data path is configured to manipulate one or more data bits in the second sequence of data packets, thereby facilitating at least equalization negotiation between the first electronic device and the second electronic device during the equalization procedure.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A and 8B illustrate an example switching process in which each of a downstream data direction and an upstream data direction of a retimer is switched from a bit level data path to a full data path, in accordance with some embodiments, respectively.

Like reference numerals refer to corresponding parts throughout the several views of the drawings.

DESCRIPTION OF EMBODIMENTS

An electronic device or component can be communicatively coupled to one or more other electronic devices or components by bidirectional data links that comply with a high-speed serial expansion bus standard, such as Peripheral Component Interconnect Express (PCI Express). A bit-level retimer processing method is implemented to transfer data with a low latency that is less than a threshold latency (e.g., 3 nsec each way), while keeping a data transfer rate of PCI Express 3.0 or above (e.g., 8 Gbps or above). Specifically, each data link includes at least one retimer that integrates a full data path and a bit level data path. Upon initiation of an equalization procedure, the full data path is selected, and the retimer determines and applies equalization coefficients (e.g., filtering coefficients of a finite impulse response driver). Subsequently, in accordance with detection of termination of the equalization procedure, the bit level data path is selected, allowing the retimer to continue to use the equalization coefficients but bypass one or more high-latency operations (e.g., bit manipulation, data decoding and encoding, data descrambling and scrambling, skew correction, serial-to-parallel conversion, parallel-to-serial conversion). The retimer is configured to enable and disable each of the full data path and the bit level data path on a physical layer of the data link automatically, which is transparent to and not intervened by any other upstream or downstream electronic devices or components.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
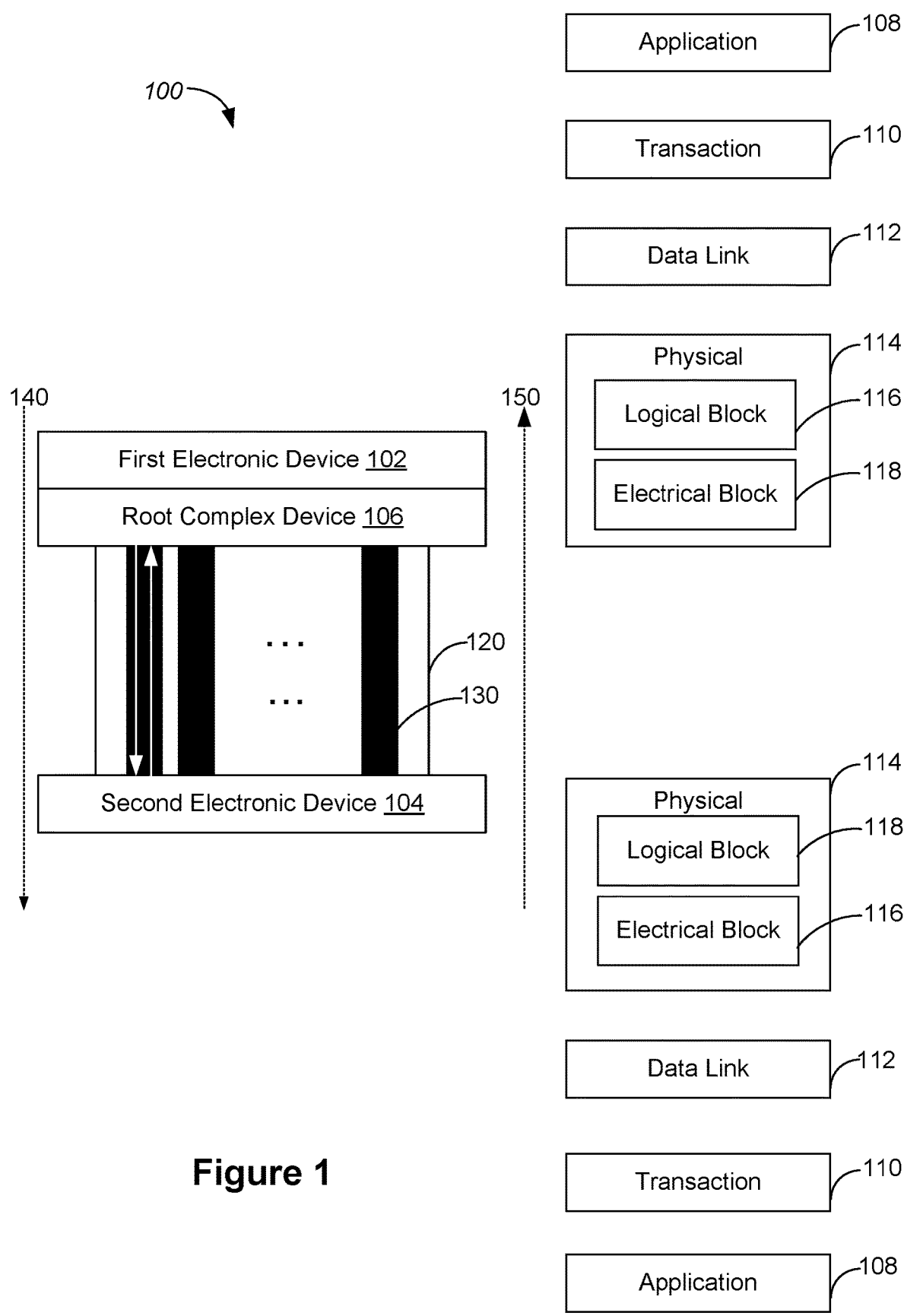
FIG. 1 is an example PCI Express electronic system in which a first electronic device or component is electrically coupled to a second electronic device or component via a data link, in accordance with some embodiments.

FIG. 1 is an example PCI Express electronic system 100 in which a first electronic device or component 102 is electrically coupled to a second electronic device or component 104 via a data link 120, in accordance with some embodiments. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 120 includes a connection port for receiving from the second electronic device 104. The connection port is optionally formed on a mother board of the personal computer. The data link 120 complies with PCI Express (i.e., PCIe), which is a high-speed serial computer expansion bus standard, and provides an interface to communicate data packets between the first and second electronic devices 102 and 104 in compliance with the PCI Express. The data link 120 is a serial data bus including one or more data transmission lanes 130. Each lane 130 includes two wire sets for transmitting and receiving data packets, thereby supporting full-duplex communication between the first and second electronic devices 102 and 104. In some examples, the data link 120 has 1, 4, 8, or 16 lanes 130 coupled in a single data port of the data link 120. For each lane, the two wire sets correspond to a downstream data direction 140 or an upstream data direction 150 defined with respect to the first electronic device 102. Optionally, each wire set includes two wires for carrying a pair of differential signals.

In some implementations, the first electronic device 102 includes or is coupled to a root complex device 106 that is further coupled to the data link 120. The root complex device 106 is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some implementations, the first electronic device 102 is coupled to one or more additional electronic devices besides the second electronic device 104. The data link 120 includes one or more switch devices to couple the root complex device 106 of the first electronic device 102 to multiple endpoints including the second electronic device 104 and additional electronic devices not shown in FIG. 1.

PCI Express is established based on a layered model including an application layer 108, a transaction layer 110, a data link layer 112, and a physical layer 114. As the top layer, the application layer 108 is implemented in software programs, such as Ethernet, NVMe, SOP, AHCI, and SATA. In the transaction layer 110, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 112. The physical layer 114 of PCI Express controls link training and electrical (analog) signaling, and includes a logical block 116 and an electrical block 118. The logic block 116 defines ordered data sets in training states (e.g., TS1 and TS2), and the electrical block 118 defines eye diagram characteristics and analog waveforms. Each layer of the layered model includes first specifications for a transmitting end where a root complex device 106 is coupled and second specifications for a receiving end where a peripheral component (i.e., the second electronic device 104) is coupled.

As high frequency signals are transmitted within the lanes 130 of the data link 120, these signals are distorted and spread over sequential symbols and result in inter symbol interferences (ISI) and bit errors at the receiving end of the second electronic device 104. These ISI and bit errors can be suppressed by a finite impulse response (FIR) driver that is coupled serially on a path of the data link 120 and configured with equalization settings using an equalization procedure. The equalization procedure is implemented when a high speed data transfer rate needs to be initialized, when an equalization request is issued from the application layer 108, or when a bit error rate (BER) exceeds a data error tolerance. A full data path is used in the equalization procedure to initialize and update the equalization settings of the FIR driver, and a bit level data path is used out of (i.e., before and after) the equalization procedure to transfer data based on the latest equalization settings that are previously initialized or updated. In some embodiments, initiation and termination of the equalization procedure are detected on the physical layer 114 based on data packets transferred over the data link 120. Control signals are generated on the physical layer 114 (i.e., not provided via the higher application or transaction layer) to enable switching between the full data path and the bit level data path.

Figure 2A:
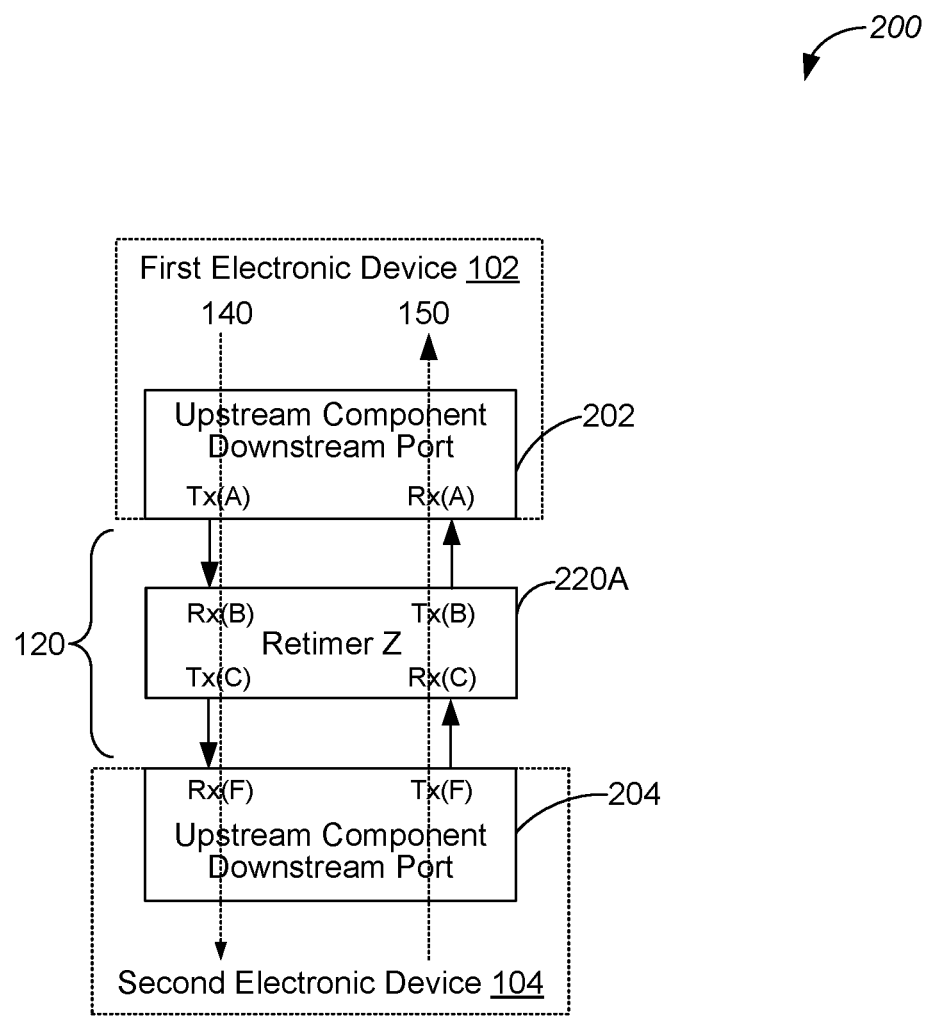
FIGS. 2A and 2B are two example electronic systems. In each of these systems a data link is coupled between two electronic devices or components and includes at least one retimer, in accordance with some embodiments.
Figure 2B:
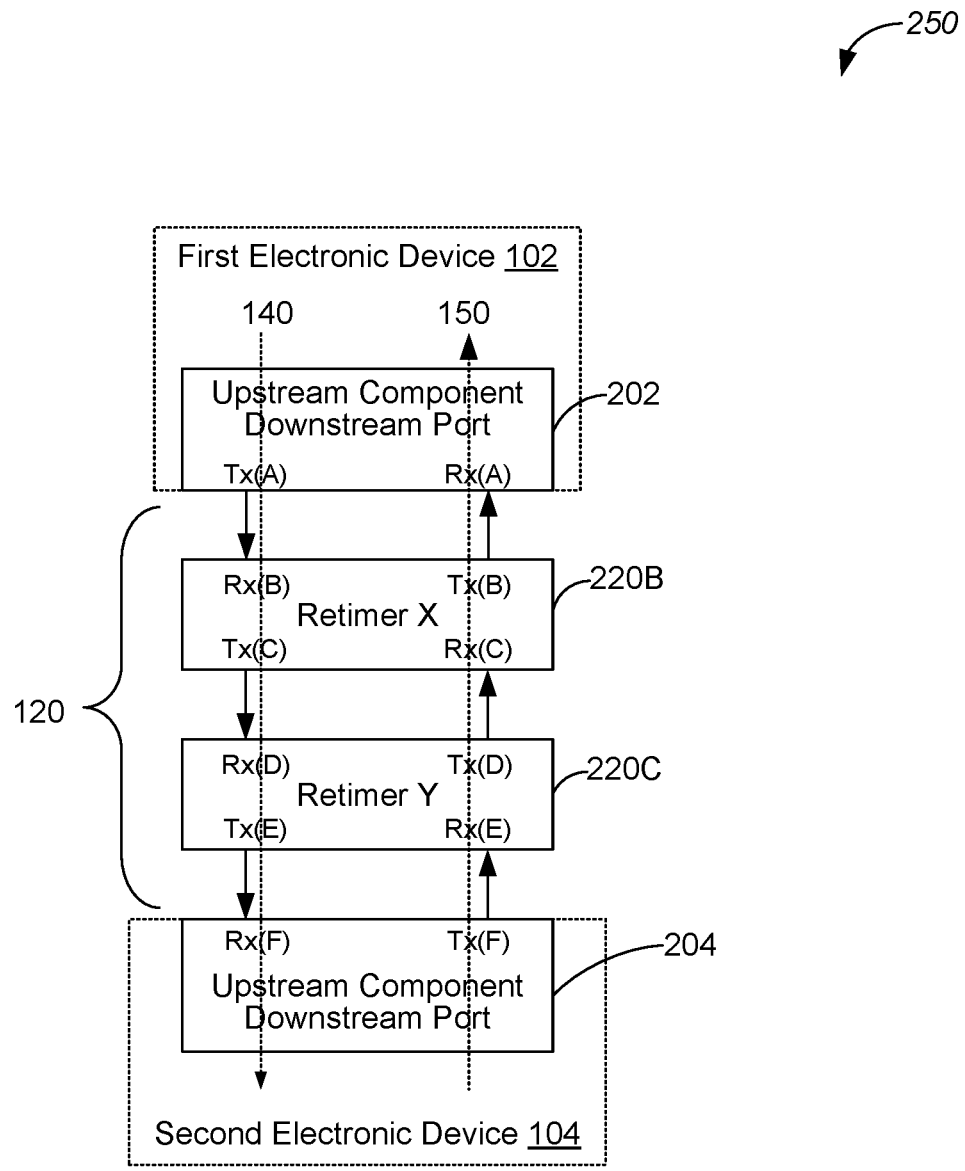
Figure 7:
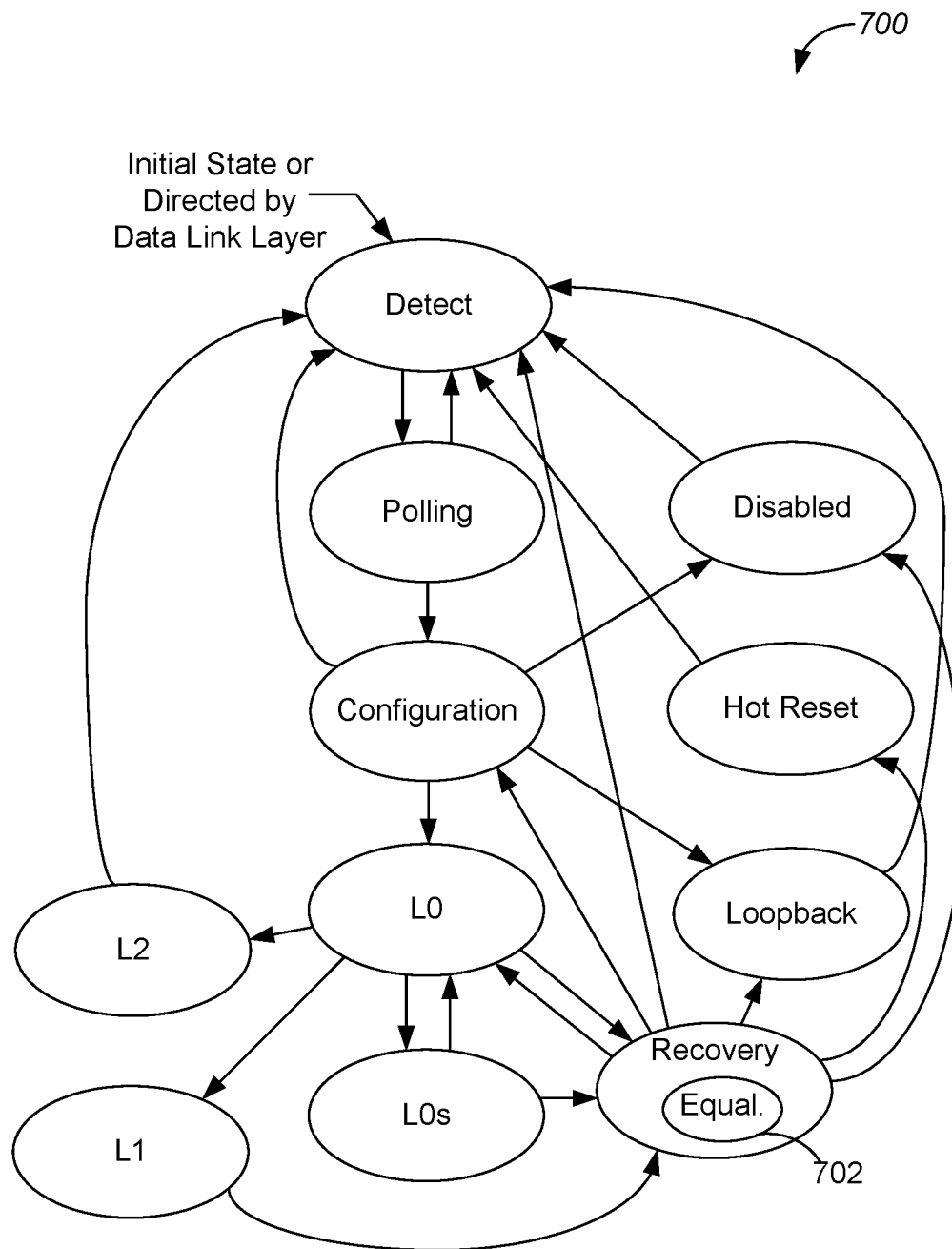
FIG. 7 is a state diagram of a Link Training and Status State Machine (LTSSM) of a data link, in accordance with some embodiments.

FIGS. 2A and 2B are two example electronic systems 200 and 250 in which a data link 120 is coupled between two electronic devices or components 102 and 104 and includes at least one retimer 220, in accordance with some embodiments. The retimer 220 is a mixed-signal device that is configured to transmit data packets actively (i.e., extract an embedded clock and recover the data packets in compliance with a bus standard, such as PCI Express). In an example, the retimer has a continuous time linear equalizer (CTLE), a wideband gain stage, and one or more of a clock and data recovery (CDR) circuit (e.g., element 302 in FIG. 3), a decision feedback equalizer (DFE), and a finite impulse response (FIR) driver. A state machine and/or a microcontroller is used in the retimer 220 to manage the CTLE, wideband gain stage, DFE, and FIR driver, and implement a link training and status state machine (LTSSM) as shown in FIG. 7.

The data link 120 enables bidirectional data communication between the electronic devices 102 and 104. A first electronic device 102 includes an upstream component 202 having a transmitting interface Tx(A) and a receiving interface Rx(A), and a second electronic device 104 includes a downstream component 204 having a receiving interface Rx(F) and a transmitting interface Tx(F). Each timer 220 of the data link 120 is coupled between the electronic devices 102 and 104, and has a receiving interface Rx and a transmitting interface Tx for each of a downstream data direction 140 and an upstream data direction 150. Referring to FIG. 2A, the data link 120 includes only one retimer 220A. In some embodiments, the retimer 220A is disposed proximity to the upstream component 202 of the first electronic device 102 or the downstream component 204 of the second electronic device 104. A receiving interface Rx(B) and a transmitting interface Tx(B) of the retimer 220A are coupled to the transmitting interface Tx(A) and receiving interface Rx(A) of the first electronic device 102, respectively. Another transmitting interface Tx(C) and another receiving interface Rx(C) of the retimer 220A are coupled to the receiving interface Rx(F) transmitting interface Tx(F) of the second electronic device 104, respectively. As such, data packets are transmitted between the electronic devices 102 and 104, either sequentially through the interfaces Tx(A), Rx(B), Tx(C), and Rx(F) on the downstream data direction 140 or sequentially through the interfaces Tx(F), Rx(C), Tx(B), and Rx(A) on the upstream data direction 150.

Referring to FIG. 2B, the data link 120 includes two retimers 220B and 220C that are electrically coupled in series between the first and second electronic devices 102 and 104. In an example, the retimer 220B is disposed proximity to the upstream component 202 of the first electronic device 102, and the retimer 220C is disposed proximity to the downstream component 204 of the second electronic device 104. A receiving interface Rx(B) and a transmitting interface Tx(B) of the retimer 220B are coupled to the transmitting interface Tx(A) and receiving interface Rx(A) of the first electronic device 102, respectively. Another transmitting interface Tx(C) and another receiving interface Rx(C) of the retimer 220B are coupled to a receiving interface Rx(D) and a transmitting interface Tx(D) of the retimer 220C, respectively. Another transmitting interface Tx(E) and another receiving interface Rx(E) of the retimer 220C are coupled to the receiving interface Rx(F) and transmitting interface Tx(F) of the second electronic device 104, respectively. As such, data packets are transmitted between the electronic devices 102 and 104, either sequentially through the interfaces Tx(A), Rx(B), Tx(C), Rx(D), Tx(E), and Rx(F) on the downstream data direction 140 or sequentially through the interfaces Tx(F), Rx(E), Tx(D), Rx(C), Tx(B), and Rx(A) on the upstream data direction 150.

Figure 3:
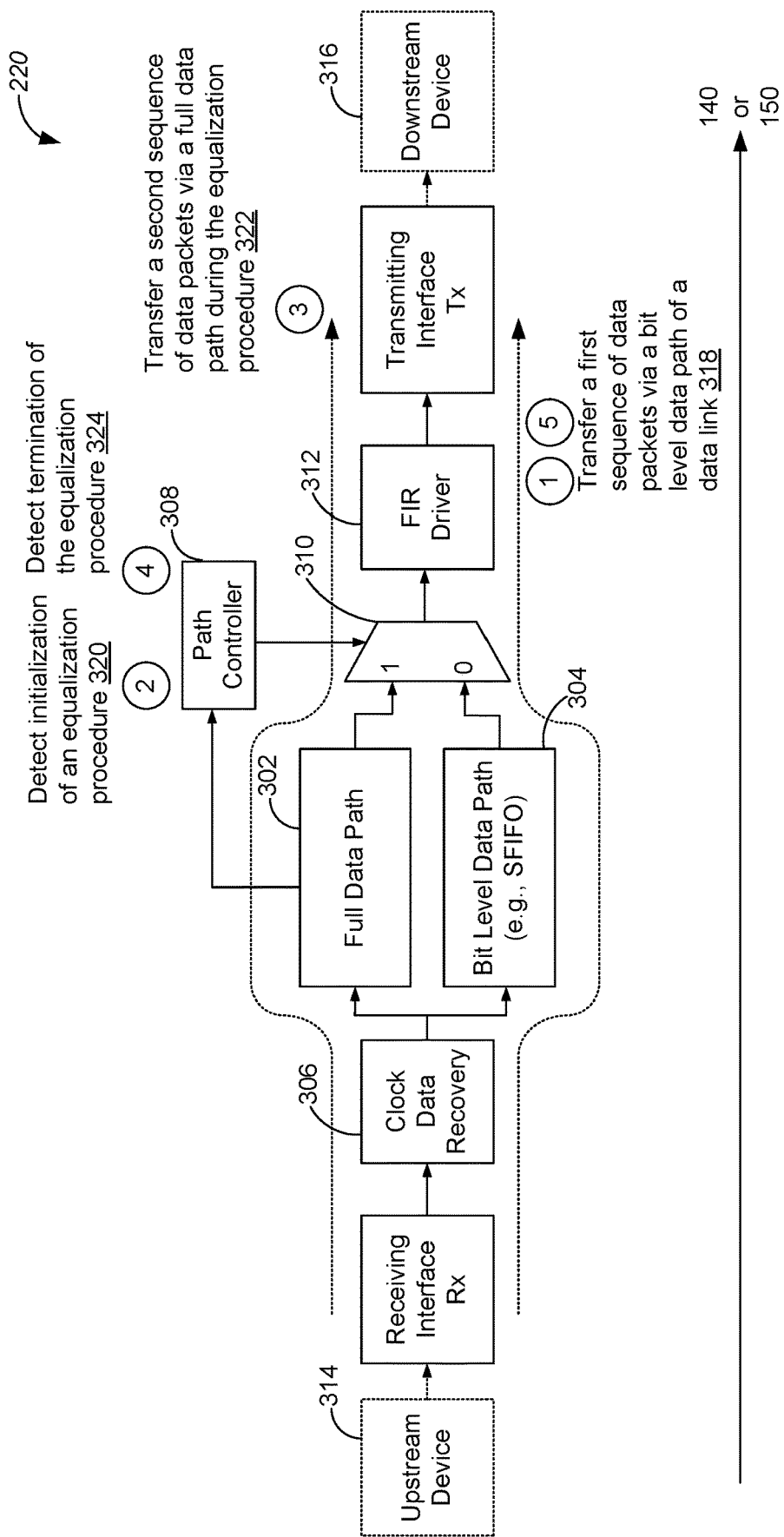
FIG. 3 is a simplified block diagram of a retimer of a data link having a full data path and a bit level data path for data transfer on a downstream or upstream data direction, in accordance with some embodiments.

FIG. 3 is a simplified block diagram of a retimer 220 of a data link 120 having a full data path 302 and a bit level data path 304 for data transfer on a downstream or upstream data direction, in accordance with some embodiments. In addition to the data paths 302 and 304, the retimer 220 includes a receiving interface Rx, clock and data recovery circuit 306, path controller 308, multiplexer 310, FIR driver 312, and a transmitting interface Tx. The retimer 220 is configured to recover and amplify signals received at the receiving interface Rx corresponding to the downstream or upstream data direction 140 or 150, thereby extending a channel reach of the data link 120. Specifically, the receiving interface Rx receives data packets from an upstream device 314. The data packets optionally include link training data, transaction requests, or transaction responses. The clock and data recovery circuit 306 recovers an embedded clock signal and data from the data packets. In some embodiments, both of the full data path 302 and bit level data path 304 process the recovered data under the control of the embedded clock signal, and the path controller 308 selects one of the full data path 302 and bit level data path 304 using a multiplexer 310 to output the processed data to be fed into the FIR driver 312. Alternatively, in some embodiments, only one of the full data path 302 and bit level data path 304 is entirely enabled by the path controller 308 to process the recovered data under the control of the embedded clock signal and feed the processed data into the FIR driver 312. An output of the FIR driver 312 is provided to the transmitting interface Tx and a downstream device 316.

Referring to FIG. 2A, on the downstream data direction 140, the upstream and downstream devices 314 and 316 of the retimer 220A are the first electronic device 102 and the second electronic device 104, respectively. On the upstream data direction 150, the upstream and downstream devices 314 and 316 of the retimer 220A are the second electronic device 104 and the first electronic device 102, respectively. Referring to FIG. 2B, on the downstream data direction 140, the upstream and downstream devices 314 and 316 of the retimer 220B are the first electronic device 102 and the retimer 220C, respectively, and the upstream and downstream devices 314 and 316 of the retimer 220C are the retimer 220B and the second electronic device 104, respectively. On the upstream data direction 150, the upstream and downstream devices 314 and 316 of the retimer 220C are the second electronic device 104 and the retimer 220B, respectively, and the upstream and downstream devices 314 and 316 of the retimer 220B are the retimer 220C and the first electronic device 102.

Referring to FIG. 3, the FIR driver 312 is configured to improve signal quality of the data packets via digital signal conditioning (e.g., via high frequency filtering in a digital domain), and has a plurality of equalization settings (e.g., filtering coefficients). A default coefficient preset or a previously determined set of filtering coefficients is applied to transmit data packets upon initiation of a data transmission process, and updated with another preset or new set of filtering coefficients during the data transmission process. To update the coefficients of the FIR driver 312, protocol-aware equalization negotiation is implemented between the upstream device 314 and the downstream device 316. For example, referring to FIG. 2A, the retimer 220A is engaged in protocol-aware equalization negotiation between the upstream component 202 and the downstream component 204. Likewise, referring to FIG. 2B, the retimer 220B is engaged in protocol-aware equalization negotiation between the upstream component 202 and the retimer 220C, and the retimer 220C is engaged in protocol-aware equalization negotiation between the retimer 220B and the downstream component 204.

Stated another way, the retimer 220 is configured to execute an equalization procedure to use the negotiation between the upstream device 314 and the downstream device 316 to update the coefficients of the FIR driver 312. In some embodiments, this equalization procedure complies with an electronic device bus standard, e.g., PCI Express 3.0 or above. The full data path 302 is applied during the equalization procedure to determine the coefficients of the FIR driver 312. For example, the negotiation and equalization procedure continues till a predefined equalization criterion is satisfied (e.g., till a bit error rate received at the downstream device 316 is less than a data error tolerance). When the equalization procedure is terminated, the retimer 3000 uses the bit level data path 304 and the FIR driver 312 that operate with the updated coefficients to forward the data packets received from the upstream device 314 to the downstream device 316. As such, in an example, the full data path 302 is enabled to set up the FIR driver 312 in the equalization procedure, when a high speed data transmission associated with PCI Express 3.0 or above is requested and needs to be initiated, and the bit level data path 304 is then enabled to operate with the FIR driver 312 that has been set up in the equalization procedure, during the subsequent high speed data transmission associated with PCI Express 3.0 or above (e.g., in a fully active state L0 in FIG. 7).

Specifically, before the equalization procedure is initiated, a first sequence of data items is received from the upstream device 314, and transferred (318) via the bit level data path 304 of the data link 120 to the downstream device 316. The FIR driver 312 adopts the default coefficient preset or a previously determined set of filtering coefficients during the course of processing the first sequence of data items, which may result in a relatively high bit error rate (e.g., $10^{-5}$). The stream of data items includes an initiation data packet indicating initiation of the equalization procedure. The path controller 308 detects (320) the initialization of the equalization procedure based on the initiation data packet in the first sequence of data packets. In accordance with detection of the initiation of the equalization procedure, the retimer 220 selects the full data path 302 for data transfer over the data link 120. During the equalization procedure, a second sequence of data packets immediately follows the first sequence of data packets, and is transferred (323) from the upstream device 314 to the downstream device 316 via the full data path 302 of the data link 120. The equalization procedure updates filtering coefficients of the FIR driver 312 based on protocol-aware equalization negotiation between the upstream and downstream components 202 and 204 (FIG. 2A) or among the upstream component 202, retimers 220B and 202C, and downstream component 204 (FIG. 2B). In some embodiments, the filtering coefficients of the FIR driver 312 are finalized and the equalization procedure can be terminated, when the bit error rates are suppressed to be less than the bit error tolerance (e.g., $10^{-12}$) at each of the receiving interfaces Tx of the upstream component 202, retimer(s) 220, and downstream component 204. The second sequence of data packets is ended with a termination data packet indicating termination of the equalization procedure. In some embodiments, the path controller 308 detects (324) termination of the equalization procedure based on the termination data packet in the second sequence of data packets. The bit level data path 304 is re-selected to transfer one or more subsequent sequences of data packets in collaboration with the FIR driver 312 using the updated filtering coefficients.

Figure 4:
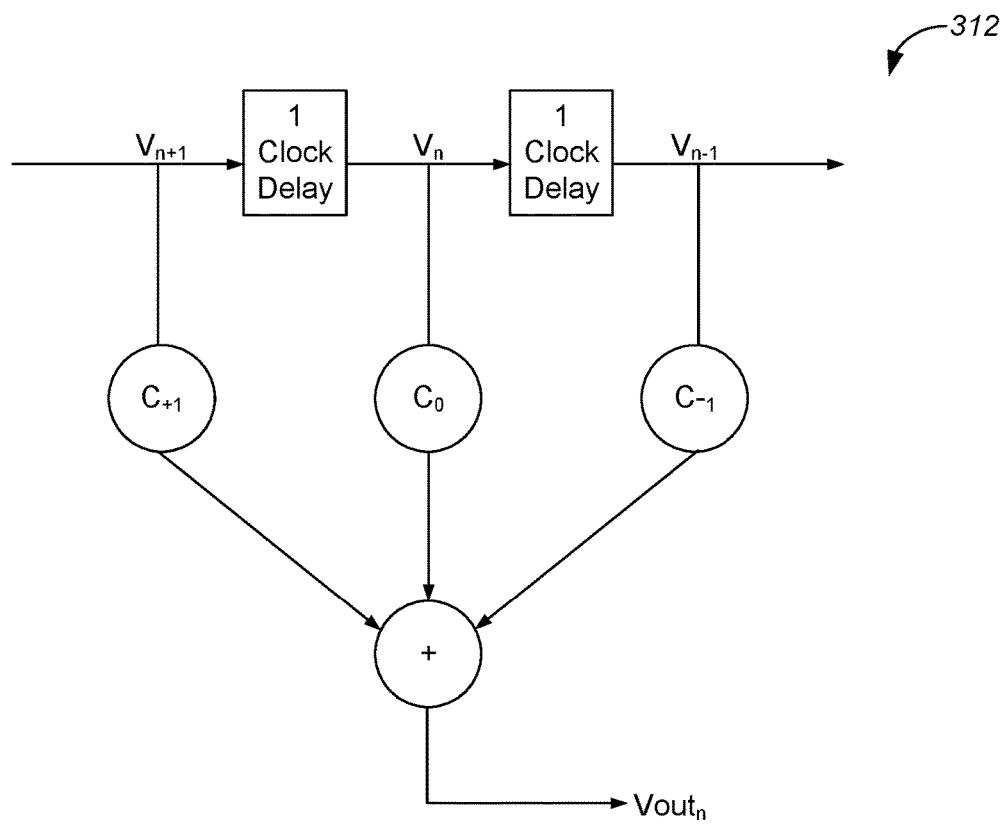
FIG. 4 is a schematic diagram of a finite impulse response (FIR) driver of a retimer, in accordance with some embodiments.

FIG. 4 is a schematic diagram of a finite impulse response (FIR) driver 312 of a retimer 220, in accordance with some embodiments. The FIR driver 312 is configured to equalize electrical signals carrying data packets to mitigate inter symbol interference and improve a bit error rate (BER), e.g., suppress the BER below a data error tolerance. In some embodiments, the FIR driver 312 has a frequency response equal to inverse of a frequency response of part of the data link 120. For example, the electrical signals are amplified with a gain at a high frequency range to counteract high-frequency signal attenuation. The FIR driver 312 includes a plurality of filtering coefficients that are determined during an equalization procedure to compensate the signal attenuation adaptively. In some embodiments, the FIR driver 312 is coupled proximate to the receiving interface Rx, e.g., between the clock and data recovery circuit 306 and the data paths 302 and 304. In some embodiments, the FIR driver 312 is coupled proximate to the transmitting interface Tx, e.g., between the multiplexer 310 and the transmitting interface Tx.

In some embodiments, the FIR driver 312 includes three filtering coefficients $C_{+1}$, $C_0$, and $C_{-1}$ configured to combine three electrical signals $V_{n+1}$, $V_n$, and $V_{n-1}$ as follows:

$$V_N = C_{-1}V_{n-1} + C_0 V_n + C_{+1}V_{n+1}.$$

Optionally, each of the electrical signals $V_{n+1}$ and $V_{n-1}$ is shifted from $V_n$ by a clock period. A first filtering coefficient $C_0$ is greater than 0, and each of a second filtering coefficient $C_{-1}$ and a third filtering coefficient $C_{+1}$ is equal to or less than 0. Values of the filtering coefficients $C_{+1}$, $C_0$, and $C_{-1}$ are subject to one or more constraints defined in an electronic device bus standard, e.g., PCI Express 3.0 or above. In some embodiments, a default preset of coefficient values is stored in a register for the filtering coefficients $C_{+1}$, $C_0$, and $C_{-1}$, and used prior to any equalization procedure. In some embodiments, a plurality of presets of coefficient values is stored in the register, and one of plurality of presets is selected to define the filtering coefficients $C_{+1}$, $C_0$, and $C_{-1}$ during the equalization procedure. In some embodiments, a set of coefficient values is determined and applied during the equalization procedure. The set of coefficient values of the filtering coefficients $C_{+1}$, $C_0$, and $C_{-1}$ is distinct from the default set or any of the plurality of presets, and is determined as a result of protocol-aware equalization negotiation. Optionally, these coefficient values of the filtering coefficients $C_{+1}$, $C_0$, and $C_{-1}$ are communicated to the FIR driver 312 in TS1/TS2 symbols in a LTSSM state (e.g., a Recovery state in FIG. 7).

Figure 5:
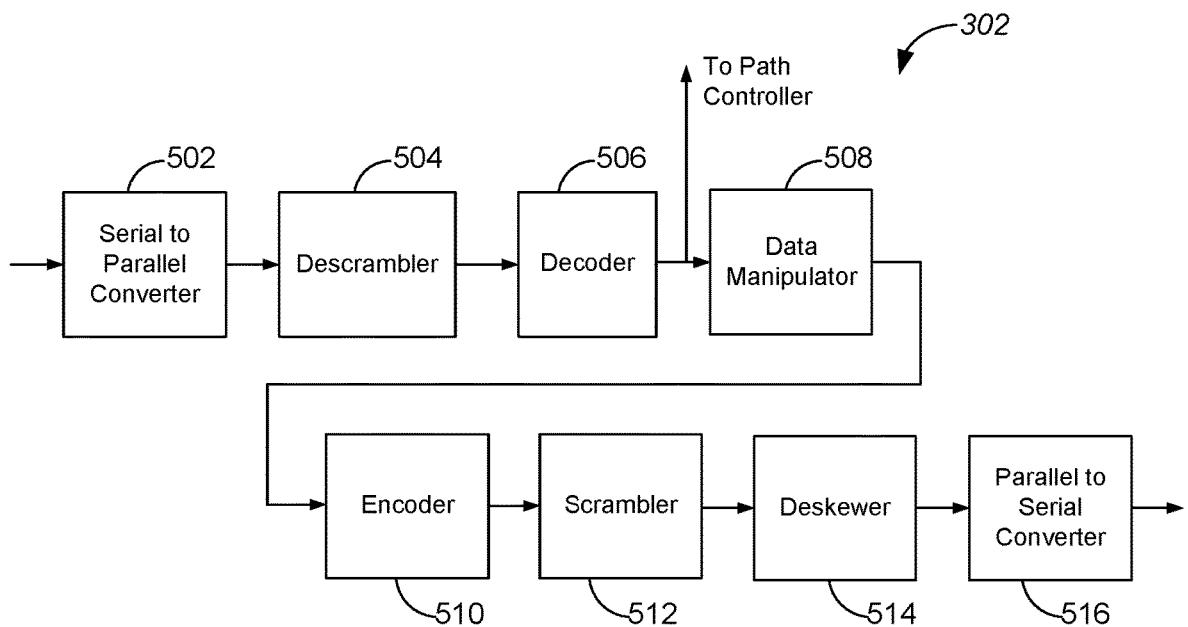
FIG. 5 is a block diagram of a full data path in a retimer of a data link, in accordance with some embodiments.

FIG. 5 is a block diagram of a full data path 302 in a retimer 220 of a data link 120, in accordance with some embodiments. The full data path 302 is configured to manipulate one or more data bits in a sequence of data packets, thereby facilitating at least protocol-aware equalization negotiation during an equalization procedure. The full data path 302 includes one or more of: a serial-to-parallel converter (i.e., deserializer) 502, descrambler 504, decoder 506, data manipulator 508, encoder 510, scrambler 512, deskewer 514, and parallel-to-serial converter (i.e., serializer) 516. The deserializer 502 receives the sequence of data packets from the clock data and recovery circuit 306 and converts the sequence of data packets into first multi-bit parallel data signals. The descrambler 506 de-scrambles the multi-bit parallel data signals to generate descrambled data signals. The decoder 504 receives the descrambled data signals and decodes the descrambled data signals. The decoded signals are then manipulated in the data manipulator 508 in compliance with an electronic device bus standard, e.g., PCI Express 3.0 or above. When data manipulation is completed, the manipulated signals are encoded by the encoder 510, scrambled by the scrambler 512, and/or deskewed by the deskewer 514 to provide second multi-bit parallel data signals, which are serialized by the serializer 516, processed by the FIR driver 312, and provided to the downstream device 316 via the transmitting interface Tx of the retimer 220.

Conversely, referring to FIG. 3, in some embodiments, the bit level data path 304 further includes a serial SFIFO circuit configured to sequentially transfer a sequence of data packets without actively altering any data bit in the sequence of data packets. The SFIFO circuit does not convert the sequence of data packets to multi-bit parallel data signals, nor does it descramble, decode, manipulate, encode, scramble, or deskew the multi-bit parallel data signals in a digital domain. The SFIFO circuit acts as a buffer to transfer the sequence of data packets. In some situations, when the sequence of data packets is transferred via the bit level data path 304, a retimer related data latency can be reduced below a threshold data latency (e.g., 3 nanoseconds or less) in a downstream or upstream direction of a data link 120 that compliance with specifications of PCI Express 3.0 or above. Alternatively, in some situations, if the sequence of data packets is transferred via the full data path 302 (e.g., during an equalization procedure), the retimer related data latency exceeds 50 nanoseconds in the downstream or upstream direction of the data link 120.

In some embodiments of this application, the full data path 302 is applied during the equalization procedure, which is only part of a link training state. Data transmission occurs during in a fully active state (L0) subsequent to the link training state, and can rely on the bit level data path 304. As such, after the equalization procedure, data transmission can benefit from the low retimer related data latency provided by the bit level data path 304. In some embodiments, while a sequence of data packets are transferred over the data link 120 with the bit level data path 304, e.g., in the fully active state (L0), the first electronic device 102 or the second electronic device 104 monitors a bit error rate of the first sequence of data packets received from a transmitting interface Tx of the data link 120, and determines whether the BER satisfies an equalization condition (e.g., the BER is less than a data error tolerance). In accordance with a determination that the BER does not satisfy the equalization condition, the receiving interface Rx receives an initiation data packet subsequently to initiate another equalization procedure to update equalization settings of the FIR driver 312 (e.g., filtering coefficients $C_{+1}$, $C_0$, and $C_{-1}$), e.g., in the link training state. The initiation data packet triggers selection of the full data path 302, and the full data path 302 is applied until the equalization procedure is terminated.

Figure 6:
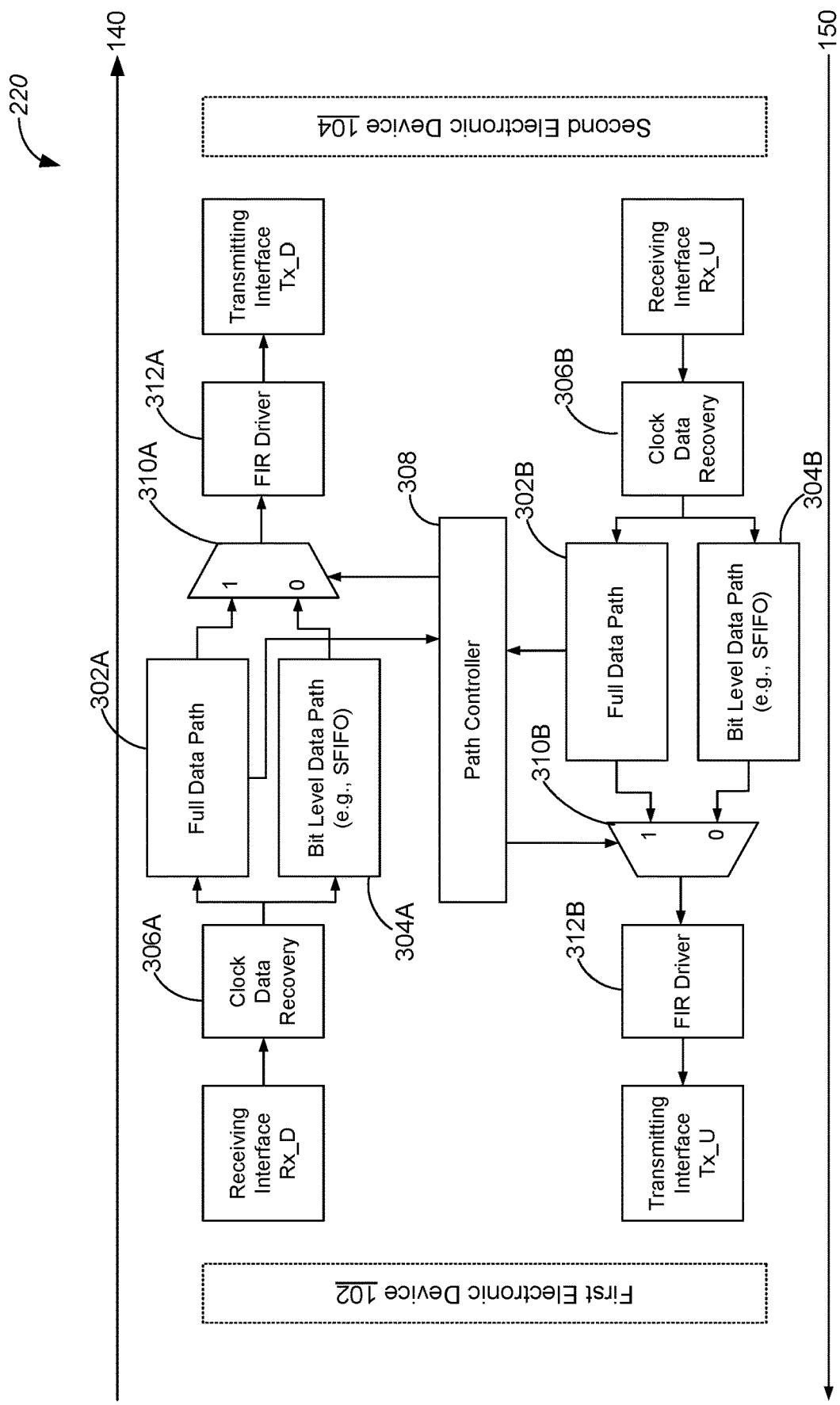
FIG. 6 is a block diagram of another retimer of a data link having a full data path and a bit level data path for transferring data along either one of two opposite data directions, in accordance with some embodiments.

FIG. 6 is a block diagram of another retimer 220 of a data link 120 having a full data path 302 and a bit level data path 304 for transferring data along either one of two opposite data directions, in accordance with some embodiments. The two opposite data directions includes a downstream data direction 140 extending from a first electronic device 102 to a second electronic device 104, and an upstream data direction 150 extending from the second electronic device 104 to the first electronic device 102. For each of the downstream and upstream data directions 140 and 150, the retimer 220 includes a respective bit level data path 304A or 304B, a respective full data path 302A and 302B, and a respective path controller 308A or 308B, respectively.

For each of the downstream and upstream data directions 140 and 150, the bit level data path 304A or 304 B is configured to transfer a first sequence of data packets from a respective upstream device to a respective downstream device during normal data transmission e.g., in a fully active state (L0). The full data path 302 is configured to transfer a second sequence of data packets, which follows the first sequence of data packets, from the respective upstream device to the respective downstream device during the equalization procedure, e.g., in a link training state. The path controller 308A or 308B is configured to (i) detect initiation of the equalization procedure, while the first sequence of data packets is being transferred, based on an initiation data packet in the first sequence of data packets and (ii) select the full data path 302A or 302B for data transfer over the data link in accordance with detection of the initiation of the equalization procedure. In some embodiments, the path controller 308A or 308B is also configured to detect termination of the equalization procedure based on a termination data packet in the second sequence of data packets and to select the bit level data path 304A or 304B of the retimer 220 for data transfer over the data link 120 in accordance with detection of the termination of the equalization procedure, respectively.

In some implementations, each of the downstream and upstream data directions 140 and 150 has an equalization procedure, independently of the other one of the downstream and upstream data directions 140 and 150. For example, a BER is monitored independently at a downstream transmitting interface Tx_D and an upstream transmitting interface Tx_U, and it is independently determined whether the BER exceeds a data error tolerance for each of the transmitting interfaces Tx_D and Tx_U and whether the corresponding data direction 140 or 150 needs the equalization procedure.

Alternatively, in some implementations, the downstream and upstream data directions 140 and 150 jointly implement an equalization procedure to update equalization settings of their respective FIR drivers 312A and 312B. The equalization procedure is completed when both of the data directions 140 and 150 are updated. During the equalization procedure, protocol-aware equalization negotiation is implemented among the first electronic device 102, retimer(s) 220, and second electronic device 104, and involves data transfer on both of the downstream and upstream data directions 140 and 150. The equalization settings of both of the FIR drivers 312A and 312B are updated as a result of the protocol-aware equalization negotiation. Training data is communicated back and forth between the first and second electronic devices 102 and 104 at least once. A PCIe equalization procedure includes four phases, phases 0, 1, 2 and 3. In phase 2, the FIR 312A coupled to the transmitting interface Tx_D on the downstream data direction 140 of each upstream component 202 or retimer 220 is trained. In phase 3, the FIR 312B coupled to the transmitting interface Tx_U on the upstream data direction 150 of each downstream component 204 or retimer 220 is trained. Referring to FIG. 2A, the FIRs 312A coupled to the transmitting interfaces Tx(A) and Tx(E) are training in phase 2, and the FIRs 312B coupled to the transmitting interfaces Tx(B) and Tx(F) are trained in phase 3. Referring to FIG. 2B, the FIRs 312A coupled to the transmitting interfaces Tx(A), Tx(C) and Tx(E) are training in phase 2, and the FIRs 312B coupled to the transmitting interfaces Tx(B), Tx(D) and Tx(F) are trained in phase 3.

In some implementations, when the downstream and upstream data directions 140 and 150 implement the equalization procedure jointly to update the settings of their respective FIR drivers 312A and 312B, the equalization procedure is started with a first initiation data packet and is concluded with a first termination data packet that are received at the receiving interface Rx_D of the downstream data direction 140. At a start of the equalization procedure, in accordance with detection of the first initiation data packet, the full data path 302A is selected to transfer data packets during the equalization procedure for the downstream data direction 140. A second initiation data packet is applied at the receiving interface Rx_U after the first initiation data packet reaches the second electronic device 104. In accordance with detection of the second initiation data packet, the full data path 302B is selected to transfer data packets during the equalization procedure for the upstream data direction 150. At an end of the equalization procedure, in accordance with detection of the first termination data packet, the bit level data path 304A is selected to transfer data packets after the equalization procedure for the downstream data direction 140. A second termination data packet is applied at the receiving interface Rx_U after the first termination data packet reaches the second electronic device 104. In accordance with detection of the second determination data packet, the bit level data path 304B is selected to transfer data packets after the equalization procedure for the upstream data direction 150. As such, switching between the full data path 302 and the bit level data path is implemented seamlessly and automatically on a physical layer of the retimer 220, and does not involve intervention from any of the first and second electronic devices 102 and 104.

FIG. 7 is a state diagram of a Link Training and Status State Machine (LTSSM) 770 of a data link 120, in accordance with some embodiments. The LTSSM 770 has five categories of states: link training states (e.g., Detect, Polling, and Configuration), a link re-training state (e.g., Recovery), power management states (e.g., L0, L1, and L2), active power management states (e.g., L0s and L1), and other states (e.g., Disabled, Loopback, Hot Reset). Each state further includes one or more sub states. After any type of Reset exit or upon a request from a data link layer 112, the data link 120 goes through the Detect, Polling, and Configuration states sequentially and reaches the fully active state (L0) in which normal data transmission is implemented.

In some embodiments, if a BER exceeds a data error tolerance in the fully active state (L0), the LTSSM 770 transitions to the Recovery state in which the data link is retrained to update settings of the FIR driver 312 via an equalization procedure 702. The full data path 302 is selected upon initiation of the equalization procedure 702, and deselected upon termination of the equalization procedure 702 (e.g., when the data link 120 returns to normal operation in the fully active state (L0)).

In some embodiments, the data link 120 is a PCI Express 3.0 or above link, and an equalization procedure is performed when a data rate is increased. Each data lane 130 is configured to transmit data at different data rates including a first data rate (e.g., 0.5 Gbps) and a second data rate (e.g., 1 Gbps) that is higher than the first data rate. The data link 120 goes through the Detect, Polling, and Configuration states sequentially and reaches the fully active state (L0). In the fully active state (L0), data packets are transferred at the first data rate, e.g., via the bit level data path 304 of the data link 120 in some situations. In response to a request to boost up a data rate of the data link 120 to the second data rate, the data link 120 enters the Recovery state in which an equalization procedure 702 is implemented to determine equalization settings of the FIR driver 312 that can support the second data rate. The full data path 302 is selected upon initiation of the equalization procedure 702, and deselected upon termination of the equalization procedure 702 (e.g., when the equalization settings of the FIR driver 312 support the second data rate and the data link 120 returns to the fully active state (L0)). When the data link 120 returns to the fully active state (L0), data packets start to be transferred at the second data rate via the bit level data path 304 of the data link 120.

Generally, the equalization procedure may be performed at least when the BER exceeds a data error tolerance and when the data rate of the data link is increased to a higher level, so does data path switching, from the bit level data path 304 to the full data path 302. As explained below with reference to FIGS. 8A-8B, 9A-9B, and 10, data path switching between the bit level data path 304 and the full data path 302 is controlled at a specific time to avoid bit unlock and block misalignment on a side of the downstream device 316.

FIGS. 8A and 8B illustrate an example switching process 800 in which each of a downstream data direction 140 and an upstream data direction 150 of a retimer 220 is switched from a bit level data path 304 to a full data path 302, in accordance with some embodiments, respectively. For each of the downstream and upstream data directions 140 and 150, a first sequence of data packets 802 or 852 is initially transferred via the bit level data path 304A or 304B of the retimer 220 of the data link 120, respectively. For the downstream data direction 140, an equalization procedure starts with receiving a first ordered training data set (TS1) 820A at a downstream receiving interface Rx_D of the retimer 220. For the upstream data direction 150, the equalization procedure starts with receiving another first ordered training data set (TS1) 870A at an upstream receiving interface Rx_U of the retimer 220.

Referring to FIG. 8A, each data packet in the first ordered training data set 820A includes an EC symbol that indicates a phase of equalization. The first ordered training data set 820A includes a first subset of data packets 804 and a second subset of data packets 806. The EC symbol of each data packet in the first data subset 804 is "01", indicating a first phase of an equalization procedure, and the EC symbol of each data packet in the second data subset 806 is "10", indicating a second phase that immediately follows the first phase of the equalization procedure. One or more data packets in the first subset of data packets 804 are transmitted via the bit level data path 304A, thereby arriving at a downstream transmitting interface Tx_D of the retimer 220 without being modified. For the downstream data direction 140, the initiation of the equalization procedure is detected when the EC symbol of "01" is detected in the first sequence of data packets 802 by the path controller 308.

In accordance with detection of the initiation of the equalization procedure, path switching is implemented (808) to select the full data path 302A for transmitting a remainder of the first ordered training data set (TS1) 820A and one or more sequences of data packets following the first ordered training data set 820A. Specifically, when the first ordered training data set 820B reaches the downstream transmitting interface Tx_D, it includes four subsets of data packets 810, 812, 814, and 816. The subset 810 corresponds to an initiation data packet that concludes the first sequence of data packets 802, and is used to detect the initiation of the equalization procedure. The subset 812 corresponds to a duration when the retimer 220 switches from the bit level data path 304A to the full data path 302A, and data packets of the subset 812 may include erroneous bits and be misaligned. The subsets 814 and 816 are transferred using the full data path 302 that is newly selected, and mark a start of a second sequence 818 of data packets transferred using the full data path 302A.

Referring to FIG. 8B, on the upstream data direction 850, the corresponding first ordered training data set 870A includes a first subset of data packets 854 and a second subset of data packets 856. The EC symbol of each data packet in the first data subset 854 is "00", while the EC symbol of each data packet in the second data subset 856 is "01". One or more data packets in the first subset of data packets 854 are transmitted via the bit level data path 304B, thereby arriving at an upstream transmitting interface Tx_U of the retimer 220 without being modified. For the upstream data direction 150, the initiation of the equalization procedure is detected when the EC symbol of "00" is detected in the first sequence of data packets 852 by the path controller 308. In accordance with detection of the initiation of the equalization procedure, path switching is implemented (858) to select the full data path 302B for transmitting a remainder of the first ordered training data set 870A and one or more sequences of data packets following the first ordered training data set 870A. Specifically, when the first ordered training data set 870B reaches the upstream transmitting interface Tx_U, it includes four subsets of data packets 860, 862, 864, and 866. The subset 860 corresponds to an initiation data packet that concludes the first sequence of data packets 802, and is used to detect the initiation of the equalization procedure. The subset 862 corresponds to a duration when the retimer 220 switches from the bit level data path 304B to the full data path 302B. The subsets 864 and 866 are transferred using the full data path 302B that is newly selected, and mark a start of a second sequence of data packets 868 transferred using the full data path 302A. Despite the subset 812 or 862 of unstable data, the sequence of data packets 818 or 868 is regarded as immediately following the first sequence of data packets 802 or 852, respectively.

Stated another way, on the downstream data direction 140, the retimer 220 switches data transfer from the bit level data path 304A to the full data path 302A when it detects an upstream device or component (e.g., the first electronic device 102) issues an equalization procedure with EC="01" in TS1 training blocks (i.e., the first subset of data packets 804). Such data path switching is guaranteed to occur when the downstream component 204 is at a Recovery.rcvrLock or Recovery.EQ.phase0 state. On the upstream data direction 150, the retimer switches data transfer from the bit level data path 304B to the full data path 302B when it detects a downstream component 204 of the second electronic device 104 issues an equalization procedure with EC="00" in TS1 training blocks (i.e., the first subset of data packets 854). Such data path switching is guaranteed to occur at a Recovery.EQ.phase1 state of the upstream component 202 of the first electronic device. These states allow the upstream and downstream components 202 and 204 to do bit lock and block alignment (e.g., during the time duration corresponding to the subsets of data packets 812 and 862).

Alternatively, in some embodiments, the retimer 220 initiates switching of data transfer from the bit level data path 304 to the full data path 302, when a start_equalization_w_preset variable defined in the specifications of PCI Express is equal to "0". When the start_equalization_w_preset variable changes to "1", the retimer 220 can start to transfer data using the full data path 302 immediately after exiting an electrical idle state (e.g., on Recovery.Speed), even before the equalization procedure starts. In this case of "start_equalization_w_preset=1", there is no need to switching from the bit level data path 304 to the full data path 302 when EC=01 appears in the first ordered training data set 820A or 870A. That said, the initiation data packet includes the start_equalization_w_preset variable, and the initiation of the equalization procedure is detected in accordance with a determination that the start_equalization_w_preset variable has a value of "1".

Figure 9A:
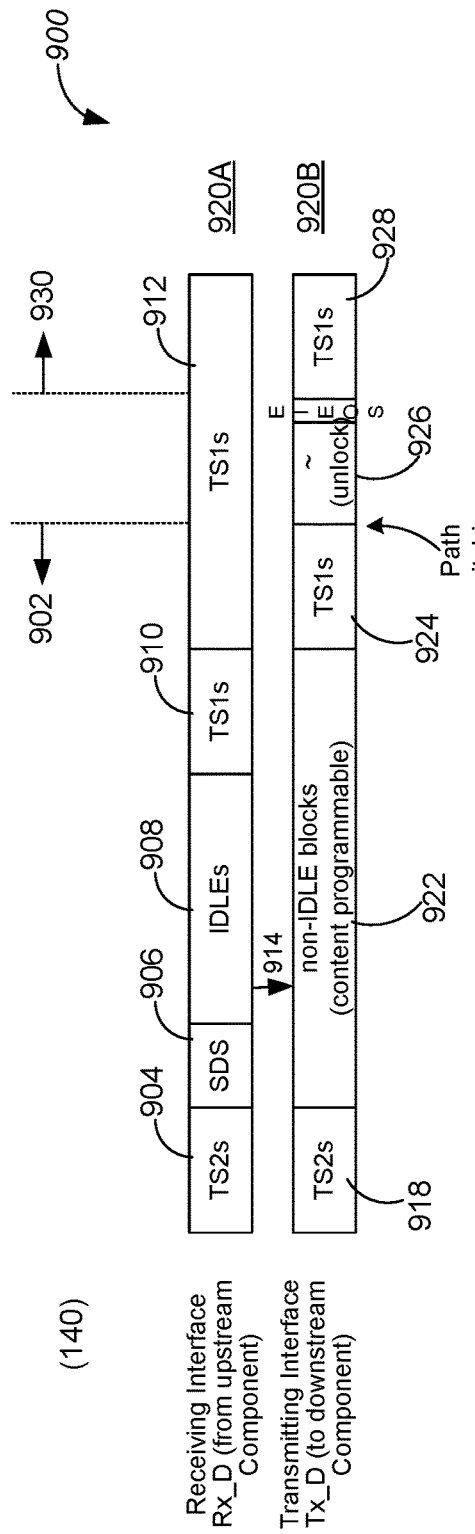
FIGS. 9A and 9B illustrate an example switching process in which each of a downstream data direction and an upstream data direction of a retimer is switched from a full data path to a bit level data path, in accordance with some embodiments, respectively.
Figure 9B:
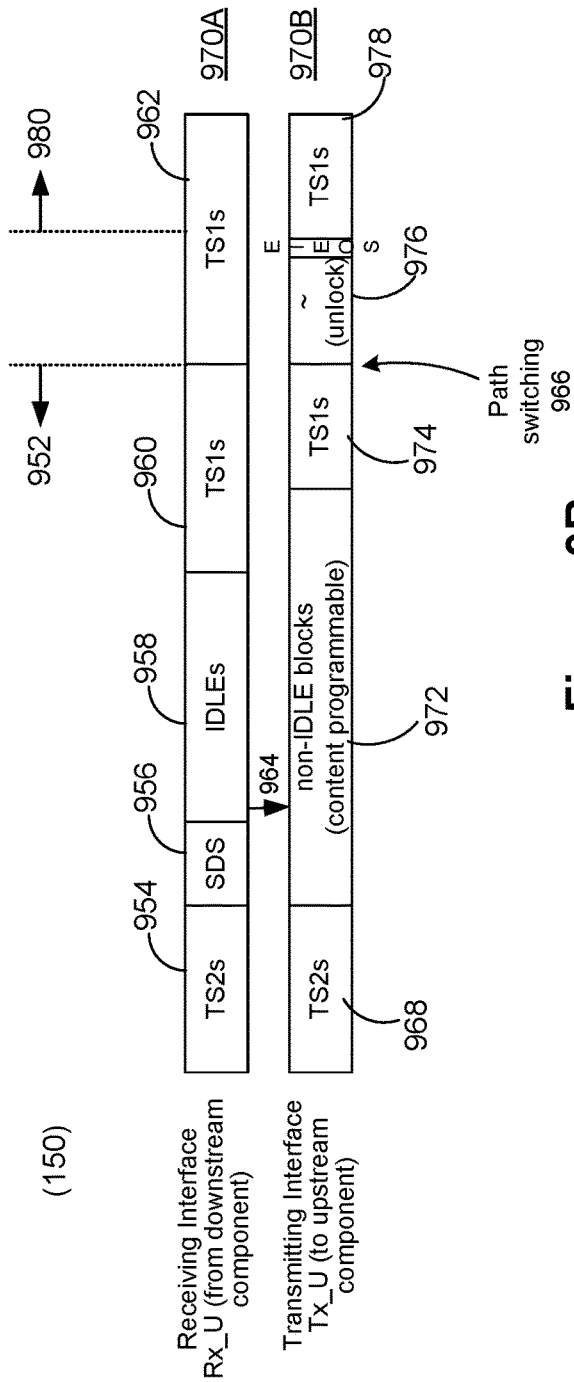

FIGS. 9A and 9B illustrate an example switching process 900 in which each of a downstream data direction 140 and an upstream data direction 150 of a retimer 220 is switched from a full data path 302 to a bit level data path 304, in accordance with some embodiments, respectively. For each of the downstream and upstream data directions 140 and 150, a second sequence of data packets 902 or 952 is initially transferred via the full data path 302A or 302B of the retimer 220 of the data link 120, respectively. For the downstream data direction 140, an equalization procedure is terminated when an ordered data set 920A is received at a downstream receiving interface Rx_D of the retimer 220. For the upstream data direction 150, the equalization procedure is terminated when another ordered data set 970A is received at an upstream receiving interface Rx_U of the retimer 220.

Referring to FIG. 9A, each data packet in the ordered data set 920A includes subsets 904, 906, 908, 910, and 912 that are sequentially ordered. The subsets 904, 910, and 912 include training data. The subset 906 includes a start data stream (SDS) data field, and the subset 908 includes an IDLE data field. The data manipulator 508 is controlled by the path controller 306 to replace predefined data in the SDS data field and IDLE data field (i.e., the subsets 906 and 908) received at the downstream receiving interface Rx_D with a non-IDLE data 914. In response to this replacing operation, the predefined value is not detected for an extended time duration (e.g., 2 ms) by the downstream component 204 coupled to the downstream transmitting interface Tx_D. The downstream component 204 does not send back a confirmation data indicating that it has entered an idle state within the extended time duration. When the upstream component 202 does not receive the confirmation data, the upstream component 202 stops sending out IDLE data sequences in the subset 908, e.g., after a number of such IDLE data sequences have been transferred, and starts to send training data sequences in the subsets 910 and 912. The termination data packet includes one or more training sequences in the subset 912. Upon detection of the termination data packet, the retimer 220 of the data link 120 determines that the equalization procedure has terminated.

In accordance with detection of the termination of the equalization procedure, path switching is implemented (916) to select the bit level data path for transmitting a remainder of the ordered data set 920 and one or more sequences of data packets following the ordered data set 920. Specifically, when the ordered data set 920B reaches the downstream transmitting interface Tx_D, it includes five subsets of data packets 918, 922, 924, 926, and 928. The subset 922 includes the non-IDLE data 914, and the subset 918 precedes the subset 922. The termination data packet corresponds to at least the training data sequences in the subset 924 when the timeout state data is detected. The subset 926 corresponds to a duration when the retimer 220 switches from the full data path 302A to the bit level data path 304A, and data packets of the subset 926 may include erroneous bits and be misaligned. The subset 928 is transferred using the bit level data path 304A that is newly selected, and marks a start of another sequence 930 of data packets transferred using the bit level data path 304A.

Referring to FIG. 9B, for the upstream data direction 150, the data manipulator 508 is configured to replace predefined data in an SDS field 956 and IDLE data field 958 received at the upstream receiving interface Rx_U with a non-IDLE data 964. In response to this replacing operation, the predefined value is not detected for an extended time duration (e.g., 2 ms) by the upstream component 202 at an upstream transmitting interface Tx_U. During the extended time duration, the downstream component 204 stops sending out IDLE data sequences in the subset 908, e.g., after a number of such IDLE data sequences have been transferred, and starts to send training data sequences in the subsets 960 and 962. The termination data packet includes one or more training sequences in the subset 960. Upon detection of the termination data packet, the retimer 220 of the data link 120 determines that the equalization procedure has terminated. In accordance with detection of the termination of the equalization procedure, path switching is implemented (966) to select bit level path for transmitting a remainder of the ordered data set 970 and one or more sequences of data packets following the second sequence of data packets 952. Specifically, the termination data packet corresponds to the non-IDLE data 964 in the subset 972 when the timeout state data is detected. The subset 976 corresponds to a duration when the retimer 220 switches from full data path 302B to bit level data path 304B. The subset 978 is transferred using the bit level data path 304B that is newly selected, and marks a start of another sequence 980 of data packets transferred using the bit level data path 304B. Despite the subset 926 or 976 of unstable data, the sequence of data packets 930 or 980 is regarded as immediately following the second sequence of data packets 902 or 952, respectively.

Stated another way, the retimer 220 switches data transfer from the full data path 302 to the bit level data path 304, when it detects termination of the equalization procedure, i.e., a switching point is in a Recovery.rcvrLock state in the subsets 912 and 962. The retimer 220 creates the switching point when the LTSSM changes from a Recovery.IDLE state to a Recovery.rcvrLock state after the equalization procedure finishes. The retimer 220 replaces SDS Ordered Set 906 or 956 and IDLE data blocks 908 or 958 in both of the downstream and upstream data directions 140 and 150 with other non-IDLE blocks 914 or 964 (content programmable block) in order to make both upstream and downstream devices time out (e.g., after 2 ms) and get into the Recovery.rcvrLock state. The retimer 220 switches from the full data path 302 to bit level data path 304 when it guarantees the upstream or downstream device that receives data is at the Recovery.rcvrLock state.

Figure 10:
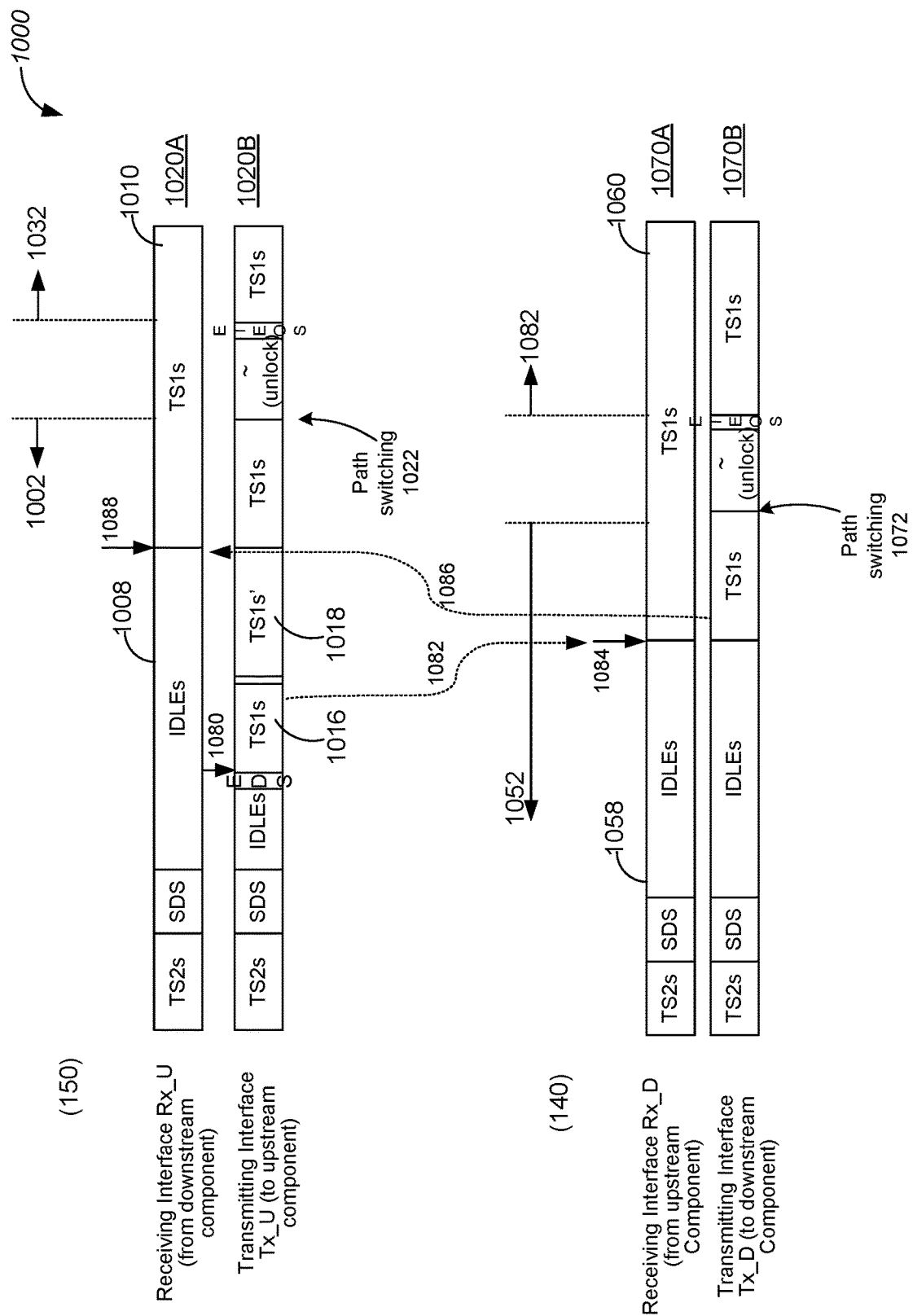
FIG. 10 illustrates another example switching process in which each of an upstream data direction and a downstream data direction of a retimer is switched from a full data path to a bit level data path, in accordance with some embodiments.

FIG. 10 illustrates another example switching process 1000 in which each of a downstream data direction 140 and an upstream data direction 150 of a retimer 220 is switched from a full data path 302 to a bit level data path 304, in accordance with some embodiments. For each of the upstream and downstream data directions 150 and 140, a second sequence of data packets 1002 or 1052 is initially transferred via the full data path 302B or 302A of the retimer 220 of the data link 120, respectively. For the upstream data direction 150, an equalization procedure is terminated when an ordered data set 1020A is received at an upstream receiving interface Rx_U of the retimer 220. For the downstream data direction 140, the equalization procedure is terminated when another ordered data set 1070A is received at a downstream receiving interface Tx_D of the retimer 220.

The ordered data set 1020A includes an IDLE data field 1008 that terminates the equalization procedure. The data manipulator 508 and/or path controller 308 is configured to shorten (1080) the IDLE data field 1008 and replace a portion of predefined data in the IDLE data field 1008, which is received at the upstream transmitting interface Tx_U, with training state data 1016 and 1018. The training state data 1018 can be corrupted training state data or other content programmable block to prevent the downstream component from moving to a next state of a Recovery.rcvrLock state.

In response to (1082) this shortening/replacing operation on the IDLE data field 1008, the upstream component 202 enters a fully active state (L0). On the downstream data direction 140, the upstream component 202 terminates (1084) IDLE data sequences in IDLE data field 1058, and starts (1084) training data sequences 1060 to the downstream receiving interface Rx_D. The retimer 220 detects termination of the L0 state upon receiving the training data sequences 1060 and switches (1072) data transfer from the full data path 302A to the bit level data path 304A accordingly. Conversely, after the downstream component 204 detects (1086) initiation of the L0 state in the ordered data set 1070B, the downstream component 204 sends out training data sequences 1010 and the upstream data direction 150 enters (1088) the L0 state. The retimer 220 detects initiation of the L0 state upon receiving the training data sequences 1010 and switches (1022) data transfer from the full data path 302B to the bit level data path 304B accordingly. By these means, a Recovery.rcvrLock state is created (1084 and 1088) for the upstream or downstream data direction 150 or 140 to facilitate path switching, and a sequence of data packets 1032 or 1082 is then transferred via the bit level data path 304 of the upstream or downstream data direction 150 or 140, respectively.

Stated another way, in some embodiments, the retimer 220 creates a switching point in the Recovery.rcvrLock state by replacing part of the IDLE data blocks 1008 in the ordered data set 1020 with EIEOS/TS1 Ordered sets to make an upstream component 202 coupled to the upstream transmitting interface Tx_U move to the Recovery.rcvrLock state right after the upstream component gets into an L0 state from a Recovery.IDLE state. After the upstream component gets into the Recovery.rcvrLock state, it sends out EIEOS/TS1 ordered sets, and then a downstream component 204 moves to the Recovery.revrLock state as well. By these means, the retimer 220 switches from the full data path 302 to bit level data path 304 when it guarantees the upstream or downstream component 202 or 204 that receives data is at the Recovery.rcvrLock state.

Figure 11:
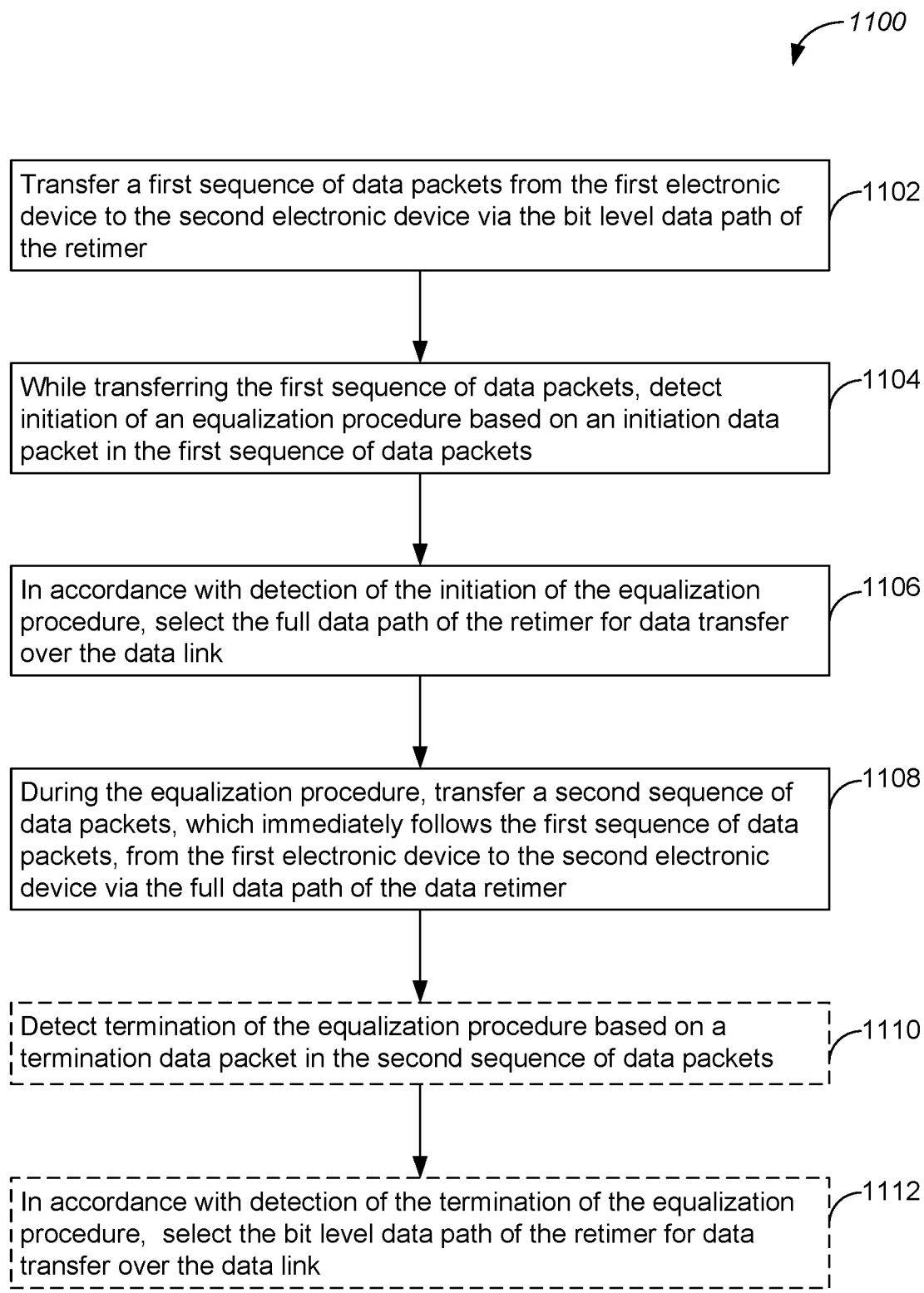
FIG. 11 is a flow diagram of a method of transferring data over a data link, in accordance with some embodiments.

FIG. 11 is a flow diagram of a method 1100 of transferring data over a data link 120, in accordance with some embodiments. The data link 120 is coupled between a first electronic device 102 and a second electronic device 104, and includes a retimer 220 having a full data path 302 and a bit level data path 304 that are coupled in parallel. In some embodiments, the bit level data path further includes a serial first in first out (SFIFO) circuit configured to sequentially transfer the first sequence of data packets via the data link 120 without altering any data bit in the first sequence of data packets. In some embodiments, the full data path further includes one or more serial-to-parallel converter, descrambler, decoder, data manipulator, encoder, scrambler, deskewer, and parallel-to-serial converter, and is configured to manipulate one or more data bits in the second sequence of data packets, thereby facilitating at least equalization negotiation between the first electronic device 102 and the second electronic device 104 during an equalization procedure.

The data link 120 transfers (1102) a first sequence of data packets from the first electronic device 102 to the second electronic device 104 via the bit level data path 304 of the retimer 220. While transferring the first sequence of data packets, the data link 120 of the data link 120 (e.g., a path controller 308) detects (1104) initiation of an equalization procedure based on an initiation data packet in the first sequence of data packets. In some situations, a bit error rate of the first sequence of data packets is monitored at an output of the retimer 220. The first or second electronic device 102 or 104 determines whether the bit error rate satisfies an equalization condition. In accordance with a determination that the bit error rate does not satisfy the equalization condition, the equalization procedure is initiated.

In some embodiments, the data link has a downstream data direction 140 and an upstream data direction 150. The bit level data path 304 and the full data path 302 of the retimer 220 correspond to one of the forward and upstream data directions 140 and 150. Further, in some embodiments, the initiation data packet belongs to a first ordered training data set 820 and has an EC symbol that indicates a phase of equalization. In accordance with a determination that the full data path corresponds to the downstream data direction 140, the data link 120 detects the initiation of the equalization procedure by detecting that data in the EC symbol of the initiation data packet is "01". In accordance with a determination that the full data path corresponds to the upstream data direction, the data link 120 detects the initiation of the equalization procedure by detecting that data in the EC symbol of the initiation data packet is "00" in the initiation data packet.

In accordance with detection of the initiation of the equalization procedure, the data link 120 (e.g., the path controller 308) selects (1106) the full data path 302 of the retimer 220 for data transfer over the data link 120. During the equalization procedure, the data link 120 transfers (1108) a second sequence of data packets, which follows the first sequence of data packets, from the first electronic device 102 to the second electronic device 104 via the full data path 302 of the retimer 220. In some embodiments, the retimer 220 further includes a finite impulse response (FIR) driver 312 coupled to both the full data path 302 and the bit level data path 304. While transferring the second sequence of data packets during the equalization procedure via the full data path 302, a plurality of filtering coefficients is updated for the FIR driver 312. The plurality of filtering coefficients continues to be utilized by the FIR driver 312, after termination of the equalization procedure and with the bit level data path 304. Further, in some embodiments, the plurality of filtering coefficients is updated by selecting one of a plurality of coefficient presets. The FIR driver 312 is coupled to the transmitting interface Tx and to an output of the full data path and an output of the bit level data path.

In some embodiments, an embedded clock signal is recovered by a clock and data recovery circuit 306 which is external to both the full and bit level data paths 302 and 304. The embedded clock signal is provided to both the bit level data path 304 and the full data path 302 for synchronizing the first and second sequences of data packets, respectively.

In some embodiments, the data link 120 (e.g., the path controller 308) detects (1110) termination of the equalization procedure based on a termination data packet in the second sequence of data packets, and selects (1112) the bit level data path of the retimer for data transfer over the data link in accordance with detection of the termination of the equalization procedure. Further, in some embodiments, the full data path 302 is controlled by the path controller 306 to replace data in at least an IDLE data field of the termination data packet with a non-IDLE data. In response to the replacing, the data link 120 (e.g., the path controller 308) receiving the termination data packet in the second sequence of data packets. The termination data packet is added by the first electronic device 102, when the first electronic device 102 cannot get a confirmation from the second electronic device 102 that has timed out due to a failure in receiving IDLE data sequences replaced in the IDLE data field. Alternatively, in some embodiments, the termination of the equalization procedure is detected by detecting initiation of a fully active state (L0) started with the termination data packet. More details on switching from the full data path 302 to the bit level data path at the termination of the equalization procedure are discussed above with reference to FIGS. 9A-9B and 10.

In some embodiments, the retimer 220 includes a first retimer 220B, and the data link 120 further includes a second retimer 220C that is coupled in series with the first retimer 220B on the data link 120. Optionally, the first retimer 220B is disposed proximate to the first electronic device 102, and the second retimer 220C is disposed proximate to the second electronic device 104.

In some embodiments, the bit level data path 304 has a first data latency. The full data path 302 has a second data latency. The second data latency is greater than the first data latency. The bit level data path 304 is enabled to transfer data in a bit-level low latency mode of the retimer, e.g., out of the equalization procedure, and the full data path 302 is enabled to transfer data in a normal data transfer mode, e.g., in the equalization procedure. This bit-level low latency mode is seamlessly activated and deactivated on a physical level of the data link by the retimer itself, automatically and without intervention from other electronic devices or components (e.g., an upstream component and a downstream component coupled to the data link).

It should be understood that the particular order in which the operations in each of FIG. 10 have been described are merely exemplary and are not intended to indicate that the described order is the only order in which the operations could be performed. One of ordinary skill in the art would recognize various ways to transferring data via a data link as described herein.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described embodiments. The first electronic device and the second electronic device are both electronic device, but they are not the same electronic device.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electronic system, comprising:
   a data link having a retimer that further includes:
      a bit level data path configured to transfer a first sequence of data packets;
      a full data path coupled in parallel with the bit level data path, the full data path configured to transfer a second sequence of data packets, which follows the first sequence of data packets during an equalization procedure; and
      a path controller coupled to the bit level data path and to the full data path, the path controller configured to (i) detect initiation of the equalization procedure, while the first sequence of data packets is being transferred and (ii) select the full data path for data transfer over the data link in accordance with detection of the initiation of the equalization procedure.

2. The electronic system of claim 1, wherein the retimer further includes a finite impulse response (FIR) driver coupled to both the full data path and the bit level data path, and the FIR filter configured to (i) update a plurality of filtering coefficients while the second sequence of data packets is transferred via the full data path during the equalization procedure and (ii) apply the plurality of filtering coefficients after termination of the equalization procedure with the bit level data path.

3. The electronic system of claim 2, wherein the plurality of filtering coefficients correspond to a coefficient present selected from a plurality of coefficient presets.

4. The electronic system of claim 1, wherein the path controller is further configured to:
   detect termination of the equalization procedure based on a termination data packet in the second sequence of data packets;
   in accordance with detection of the termination of the equalization procedure, select the bit level data path of the retimer for data transfer over the data link.

5. The electronic system of claim 1, wherein the retimer further comprises:
   a multiplexer coupled to the path controller, the bit level data path, and the full data path, wherein the multiplexer is configured to be controlled by the path controller to select either the bit level data path or the full data path for data transfer over the data link.

6. The electronic system of claim 1, wherein the retimer further comprises:
   a clock data recovery component coupled to the bit level data path and the full data path, the clock data recovery component configured to recover an embedded clock signal and provide the embedded clock signal to both the bit level data path and the full data path for synchronizing the first and second sequences of data packets, respectively.

7. The electronic system of claim 1, wherein:
the bit level data path further includes a serial first in first out (SFIFO) circuit configured to sequentially transfer the first sequence of data packets via the data link without altering any data bit in the first sequence of data packets; and
the full data path further includes one or more serial-to-parallel converters, descramblers, decoders, data manipulators, encoders, scramblers, deskewers, and parallel-to-serial converters, and the full data path is configured to manipulate one or more data bits in the second sequence of data packets, thereby facilitating at least handshakes between two opposite analog frontends of the retimer during the equalization procedure.

8. The electronic system of claim 1, wherein:
the data link has a downstream data direction and an upstream data direction; and
the bit level data path and the full data path of the retimer correspond to one of the downstream and upstream data directions.

9. A data link, comprising:
a retimer that further includes:
a bit level data path configured to transfer a first sequence of data packets;
a full data path coupled in parallel with the bit level data path, the full data path configured to transfer a second sequence of data packets, which follows the first sequence of data packets during an equalization procedure; and
a path controller coupled to the bit level data path and to the full data path, the path controller configured to (i) detect initiation of the equalization procedure, while the first sequence of data packets is being transferred and (ii) select the full data path for data transfer over the data link in accordance with detection of the initiation of the equalization procedure.

10. The data link of claim 9, wherein:
the data link has a downstream data direction and an upstream data direction; and
the bit level data path and the full data path of the retimer correspond to one of the downstream and upstream data directions.

11. The data link of claim 10, wherein an initiation data packet belongs to a first ordered training data set and has an EC symbol that indicates a phase of equalization, and wherein the path controller is configured to detect the initiation of the equalization procedure by:
in accordance with a determination that the full data path corresponds to the downstream data direction, detecting that data in the EC symbol of the initiation data packet is "01"; and
in accordance with a determination that the full data path corresponds to the upstream data direction, detecting that the data in the EC symbol of the initiation data packet is "00".

12. The data link of claim 10, wherein an initiation data packet includes a start_equalization_w_preset variable, and the path controller is configured to detect initiation of the equalization procedure by detecting that the start_equalization_w_preset variable is equal to "1".

13. The data link of claim 9, wherein:
the bit level data path further includes a serial first in first out (SFIFO) circuit configured to sequentially transfer the first sequence of data packets via the data link without altering any data bit in the first sequence of data packets; and
the full data path further includes one or more serial-to-parallel converters, descramblers, decoders, data manipulators, encoders, scramblers, deskewers, and parallel-to-serial converters, and the full data path is configured to manipulate one or more data bits in the second sequence of data packets, thereby facilitating at least equalization negotiation during the equalization procedure.

14. The data link of claim 9, wherein:
the bit level data path has a first data latency; and
the full data path has a second data latency, the second data latency being greater than the first data latency.

15. The data link of claim 9, wherein the retimer is configured to:
monitor a bit error rate of the first sequence of data packets at an output of the retimer; and
determine whether the bit error rate satisfies an equalization condition; and
in accordance with a determination that the bit error rate does not satisfy the equalization condition, initiate the equalization procedure.

16. The data link of claim 9, wherein the retimer includes a first retimer, and the data link further includes a second retimer that is coupled in series with the first retimer on the data link.

17. A method, comprising:
at a data link including a retimer having a full data path and a bit level data path that are coupled in parallel:
transferring a first sequence of data packets via the bit level data path of the retimer;
while transferring the first sequence of data packets, detecting initiation of an equalization procedure;
in accordance with detection of the initiation of the equalization procedure, selecting the full data path of the retimer for data transfer over the data link; and
during the equalization procedure, transferring a second sequence of data packets, which follows the first sequence of data packets via the full data path of the retimer.

18. The method of claim 17, further comprising at the data link:
detecting termination of the equalization procedure based on a termination data packet in the second sequence of data packets;
in accordance with detection of the termination of the equalization procedure, selecting the bit level data path of the retimer for data transfer over the data link.

19. The method of claim 18, wherein detecting the termination of the equalization procedure further comprises:
replacing, by the full data path, data in at least an IDLE data field of the termination data packet with a non-IDLE data; and
in response to the replacing, receiving the termination data packet in the second sequence of data packets.

20. The method of claim 18, wherein detecting the termination of the equalization procedure further comprises:
detecting initiation of a fully active state (L0) started with the termination data packet.

* * * * *